United States Patent
Heibl et al.

(10) Patent No.: US 12,095,516 B2
(45) Date of Patent: Sep. 17, 2024

(54) TRANSMITTER WITH A FREQUENCY MEASUREMENT STAGE

(71) Applicant: RENESAS DESIGN AUSTRIA GMBH, Graz (AT)

(72) Inventors: Stefan Heibl, Graz (AT); Michael Pieber, Graz (AT); Andreas Schröck, Graz (AT)

(73) Assignee: RENESAS DESIGN AUSTRIA GMBH, Graz (AT)

( * ) Notice: Subject to any disclaimer, the term of this patent is extended or adjusted under 35 U.S.C. 154(b) by 0 days.

(21) Appl. No.: 18/560,209

(22) PCT Filed: May 12, 2022

(86) PCT No.: PCT/EP2022/062960
§ 371 (c)(1),
(2) Date: Nov. 10, 2023

(87) PCT Pub. No.: WO2022/243173
PCT Pub. Date: Nov. 24, 2022

(65) Prior Publication Data
US 2024/0267136 A1  Aug. 8, 2024

(30) Foreign Application Priority Data

May 18, 2021 (EP) ..................... 21174246

(51) Int. Cl.
*H04B 17/15* (2015.01)
*H04B 5/48* (2024.01)

(52) U.S. Cl.
CPC .............. *H04B 17/15* (2015.01); *H04B 5/48* (2024.01)

(58) Field of Classification Search
CPC .................................................. H04B 17/15
See application file for complete search history.

(56) References Cited

U.S. PATENT DOCUMENTS

| | | | | |
|---|---|---|---|---|
| 2005/0230480 A1* | 10/2005 | Kolstad | ............. | G06K 7/10851 235/462.26 |
| 2008/0001719 A1* | 1/2008 | Koo | .................... | G06K 7/0008 375/316 |

(Continued)

FOREIGN PATENT DOCUMENTS

| | | |
|---|---|---|
| EP | 1770665 A1 | 4/2007 |
| EP | 3267589 B1 | 1/2020 |
| JP | 2009111483 A | 5/2009 |

OTHER PUBLICATIONS

International Search Report and Written Opinion, mailed Sep. 6, 2022, from PCT/EP2022/062960, 11 pages.

(Continued)

*Primary Examiner* — Hsinchun Liao
(74) *Attorney, Agent, or Firm* — Workman Nydegger

(57) ABSTRACT

A transmitter configured to transmit a modulated transmitter data signal in an RF-Field over the air and configured to receive a modulated receiver data signal, which transmitter comprises a transmitter stage configured to generate the modulated transmitter data signal with a particular frequency and waveform based on a carrier signal and an antenna connected to the transmitter stage via a matching circuit of the transmitter and configured to transmit the modulated transmitter data signal in the RF-Field over the air a receiver stage connected via the matching circuit to the antenna and configured to receive the modulated receiver data signal, wherein the transmitter includes a measurement stage to measure an actual resonance frequency ($f_{peak}$) of the antenna and its matching circuit connected to the transmitter stage and to the receiver stage.

6 Claims, 2 Drawing Sheets

(56) References Cited

U.S. PATENT DOCUMENTS

2014/0080409 A1 3/2014 Frankland et al.
2018/0034510 A1 2/2018 Hueber et al.

OTHER PUBLICATIONS

International Preliminary Report on Patentability, mailed Aug. 4, 2023, from PCT/EP2022/062960, 17 pages.

* cited by examiner

TRANSMITTER WITH A FREQUENCY MEASUREMENT STAGE

FIELD OF THE INVENTION

The present invention relates to a transmitter configured to transmit a modulated transmitter data signal in an RF-Field over the air and configured to receive a modulated receiver data signal, which transmitter comprises:
 a transmitter stage configured to generate the modulated transmitter data signal with a particular frequency and waveform based on a carrier signal;
 an antenna connected to the transmitter stage via a matching circuit of the transmitter and configured to transmit the modulated transmitter data signal in the RF-Field over the air; a receiver stage connected via the matching circuit to the antenna and configured to receive the modulated receiver data signal.

BACKGROUND OF THE INVENTION

Known Radio Frequency IDentification communication systems use integrated circuits like ST25R3916 in RFID readers or transmitters to communicate with active or passive receivers. In a typical application, a passive receiver (e.g. transponder or tag) stores product identification of a product to which it is attached and the transmitter (e.g. reader) is used to obtain this product information. The transmitter is powered and generates a magnetic RF-Field emitted by its antenna. When the transmitter and the tag are within close proximity of each other, the transmitter generated RF-Field is induced into the antenna of the tag and used to power the passive tag. The tag also has a transceiver to receive the signal from the reader and to transmit a response back to the transmitter as load modulated receiver data signal.

There are standards like ISO/IEC18000-3 or ISO/IEC 14.443 Type A and B or ISO15.693 or ECMA-340 13.56 MHz Near Field Communication (NFC) or the NFC Forum or company standards like Felica from company Sony that define protocols and types of modulation used to transmit information between the tag and the reader. Some or all of these standards define to use an amplitude modulation to transmit an amplitude modulated data signal with digital data within the RF-Field over the air to the tag. ISO14.443 Type A for instance furthermore defines to use a modified Miller encoding to encode the data signal into an encoded data signal for the transmission.

All these standards define a system frequency of the carrier signal to be used like 13.56 MHz for the NFC standard. Other RFID standards define a carrier signal in the kHz or the GHz frequency area. The antenna systems of active transmitters are tuned or adjusted to be in resonance at this system frequency to achieve a maximal transmission range. Passive transponders are tuned or adjusted to be in resonance at this system frequency to generate as much as possible energy from the RF-Field generated by the transmitter for internal power generation. A White Paper of Nordic Semiconductors with the title "nRF52832 NFC Antenna Tuning" discloses external test equipment like an oscilloscope and a signal generator to measure the actual resonance frequency of the transmitter or passive transponder and to adjust it to the system frequency. Another complex and expensive test equipment to measure the actual resonance frequency is disclosed in the document "AN11535" of NXP Semiconductors.

Due to component tolerances each individual transmitter might have a different need to tune a variable capacity of the matching circuit to ensure that the actual resonance frequency of the transmitter is the system defined resonance frequency, what is done at the end of the manufacturing process with such test equipment. In some cases a component of the matching circuit is exchanged as variable components are usually more expensive and need to be manually adjusted. After the transmitter is mounted in the position of the particular application it might be needed to repeat this tuning process again as the housing of the transmitter or other metal devices close-by in the RF-Field may have an influence on the actual resonance frequency of the transmitter. These tuning processes increase the technical complexity in the manufacturing and implementation process of the transmitter. A further disadvantage is that, if during the use of the transmitter e.g. a metal device is mounted close-by in the RF-Field of the transmitter, the actual resonance frequency might change what reduces the transmission range and might cause to failures of the system, if the communication between the transmitter and receiver does not work in the borders of the system defined communication range.

Prior art documents US 2014/080409 A1 and EP 1 770 665 A1 and US 2018/034510 A1 and JP 2009 111483 A disclose such a transmitter configured to transmit a modulated transmitter data signal in an RF-Field over the air and configured to receive a modulated receiver data signal.

SUMMARY OF THE INVENTION

It is an object of the invention to ease the technical complexity and to ensure that the transmitter complies with the expected or system defined resonance frequency of the RF-Field. This object is achieved with a transmitter that furthermore comprises a measurement stage to measure the actual resonance frequency of the antenna and its matching circuit connected to the transmitter stage and to the receiver stage.

This concept of realizing the measurement of the resonance frequency of the transmitter within the transmitter itself enables major advantages. As there is no external test equipment what influences the measurement result with its own influence of the RF-Field, the measurement of the resonance frequency of the transmitter is very accurate. Furthermore it is possible to measure the resonance frequency at any time like e.g. at every power on of the transmitter or in time periods during its use what enables to adapt easily to events that have an influence on the RF-Field and what enables to ensure compliance with the standard during the lifetime of the transmitter. In principle the measurement result could be displayed at the transmitter to inform a worker that a manual adjustment of the resonance frequency is needed. In a preferred embodiment the transmitter comprises a control logic that activates an adjustment mode after the measurement of the actual resonance frequency has been completed and adjusts the actual resonance frequency to the expected or system or standard defined resonance frequency by tuning a variable capacity. This variable capacity might be part of the external matching circuit or part of the integrated circuit of the transmitter. The control logic realized in the integrated circuit of the transmitter steers the external or internal variable capacity.

This technology never has been used and realized in the integrated circuit that generates and transmits the carrier signal of which the resonance frequency has to be measured and trimmed. The claimed transmitter with a measurement stage uses a carrier signal stage that sweeps the frequency in the relevant frequency range and measures the actual resonance frequency of the antenna system, which is set-up by the antenna and the matching circuit and the integrated circuit of the transmitter and maybe some other metal devices close by in the RF-Field. For the measurement of the actual resonance frequency an unmodulated sinusoid waveform of the transmitter data signal is used to avoid disturbances due to multiples of the carrier frequency generated with other waveforms like a square wave. The received unmodulated receiver data signal is analyzed by mixing it with the actual carrier signal and a DC compensation stage retrieves the DC signal part at a 0 Hz frequency of the output signal of the mixer. These DC signal parts for the different actual carrier signals within the frequency range are used to generate a frequency peak signal to show the DC signals parts over the frequency range. The frequency with the maximal amplitude of this frequency peak signal is the measured actual resonance frequency of the antenna system of the transmitter. Based on this measured actual resonance frequency the antenna system may be tuned with the variable capacity to move the actual resonance frequency into the system defined resonance frequency in a manual or automated adjustment process. In another embodiment of the invention the received unmodulated receiver data signal is analyzed by mixing it with the actual carrier signal plus an offset-frequency as mixer signal and a signal part of the output signal of the mixer at this offset-frequency is used to generate the frequency peak signal.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 1:
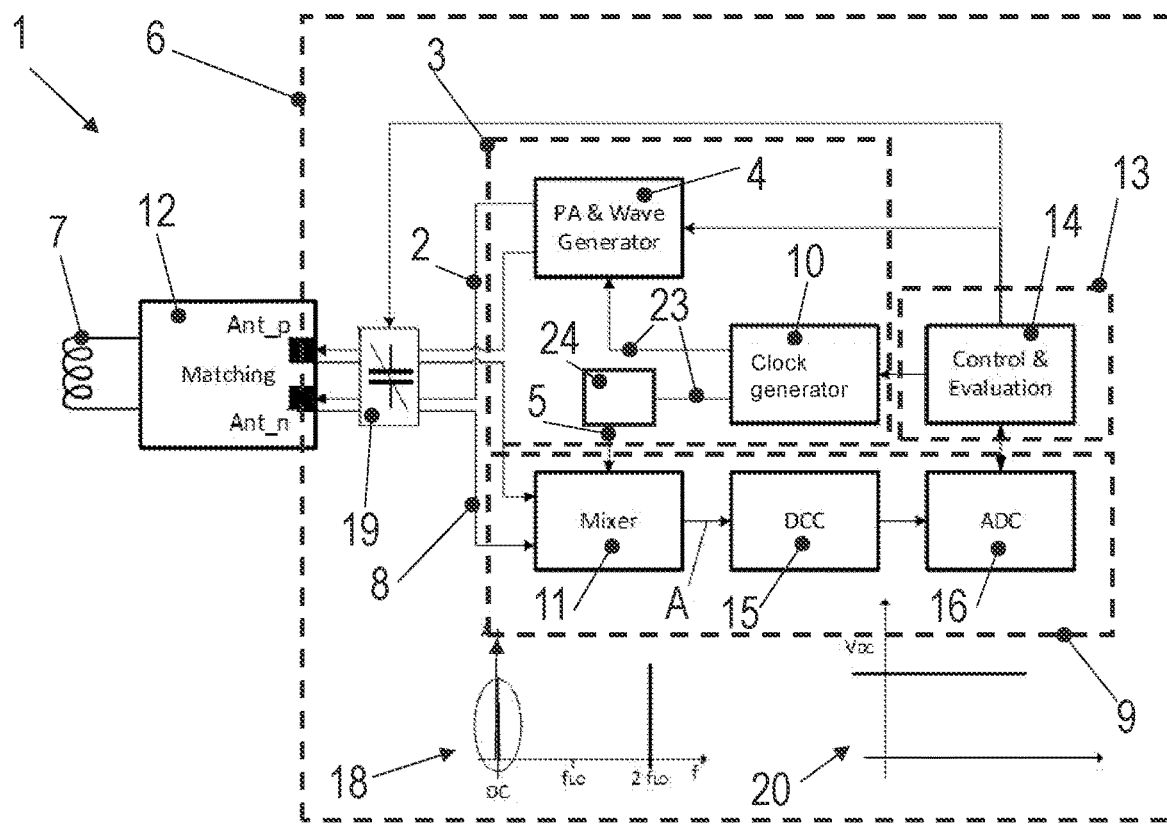
FIG. 1 shows a first embodiment of a transmitter to transmit an amplitude modulated data signal and measure the actual resonance frequency of the antenna system of the transmitter according to the invention.

FIG. 1 shows a transmitter 1 to transmit an amplitude modulated transmitter data signal 2 in an RF-Field over the air to a receiver of an RFID communication system according to a first embodiment of the invention. The transmitter 1 comprises a transmitter stage 3 with a wave generator 4 to generate the amplitude modulated transmitter data signal 2 with a particular frequency and waveform based on a carrier signal 5. A clock generator 10 provides an internal clock signal 23 and wave generator 4 is able to generate a sinusoid waveform wave by wave with the frequency of the carrier signal 5, which wave generator 4 is known from EP 3 182 585 B1 of the same applicant. Wave generator 4 furthermore comprises an amplifier to amplify the generated amplitude modulated transmitter data signal 2. This prior art document discloses a digital power amplifier, which generates a sinusoid wave by small increments of M digital wave-forming bits which add up increments of output current to generate a sinusoid wave. To achieve that wave generator 4 receives the clock signal 23 from the clock generator 10 with a frequency that is a multiple (e.g. 64) times of the frequency of the carrier signal 5 to generate the sinusoid wave with the frequency of the carrier signal 5. The RFID communication system complies to the NFC Standard ISO 18.092, which defines a resonance frequency of the carrier signal 5 of 13.56 MHz with the waveform of a sinus. The RFID communication system furthermore complies to ISO/IEC 14.443 Type A and B or ISO15.693 or ECMA-340 13.56 MHz. The transmitter 1 is realized in an integrated circuit 6 and provides the amplitude modulated transmitter data signal 2 via an amplifier at an antenna pin Ant_p and an antenna pin Ant_n of the integrated circuit 6. In this embodiment the antenna pin Ant_p and the Ant_n Pin Ant_n are connected with two lines with the transmitter stage 3 and with two lines with a receiver stage 9 and the amplitude modulated transmitter data signal 2 and a modulated receiver data signal 8 are differential signals. A matching circuit 12 is connected to the antenna pin Ant_p and the antenna pin Ant_n and matches the impedances to an antenna 7. The matching circuit 12 and the antenna 7 are arranged to transmit the amplified amplitude modulated transmitter data signal 2 in resonance to the close-by receiver that could be realized as passive or active tag or any other active device like e.g. a mobile phone. Even if there is no receiver in the RF-Field of the transmitter 1, there are disturbances of things within the RF-Field and influences of the matching circuit 12 and the antenna 7 that lead to a received signal and in particular to a received unmodulated or modulated receiver data signal 8 at antenna pin Antp and antenna pin Ant_n.

Transmitter 1 comprises the receiver stage 9 connected via the antenna pin Ant_p and the antenna pin Ant_n and via the matching circuit 12 to the antenna 7 to receive the modulated receiver data signal 8. The receiver stage 9 comprises a mixer 11 to mix the received modulated receiver data signal 8 with the carrier signal 5 generated with a carrier signal stage 24 based on the clock signal 23 of the clock generator 10. Clock signal 23 and carrier signal 5 are always in a fixed relation as the frequency of the clock signal 23 is a multiple of the carrier signal 5. Transmitter 1 furthermore comprises a wave shape measurement stage to measure the shape of the received modulated receiver data signal 8 with equivalent time sampling. Equivalent time sampling is known to a person skilled in the art and enables to capture periodic signals with a much higher effective sample rate than the actual sample rate of an AD converter used. During each repetition of the periodic signal other parts of the wave shape are sampled and combined in post-processing of the sampled data to provide the high resolution signal. Such equivalent time sampling is known to be used in oscilloscopes to improve the details of the measured and displayed signal. Transmitter 1 with its waves shape measurement stage realizes a wave shape measurement based on equivalent time sampling of the received modulated receiver data signal received in the RF-Field generated by the transmitter 1 itself. This technology is described in another patent application filed at the same day and is not of relevance for the invention claimed in this patent application.

Transmitter 1 according to the invention comprises a measurement stage 13 to measure the actual resonance frequency $f_{peak}$ of the antenna system which is influenced by the antenna 7 and its matching circuit 12 connected to the transmitter stage 3 and to the receiver stage 9. The actual resonance frequency $f_{peak}$ of the antenna system may furthermore be influenced by metallic devices in the RF-Field or other influences known to the person skilled in the art.

Figure 2:
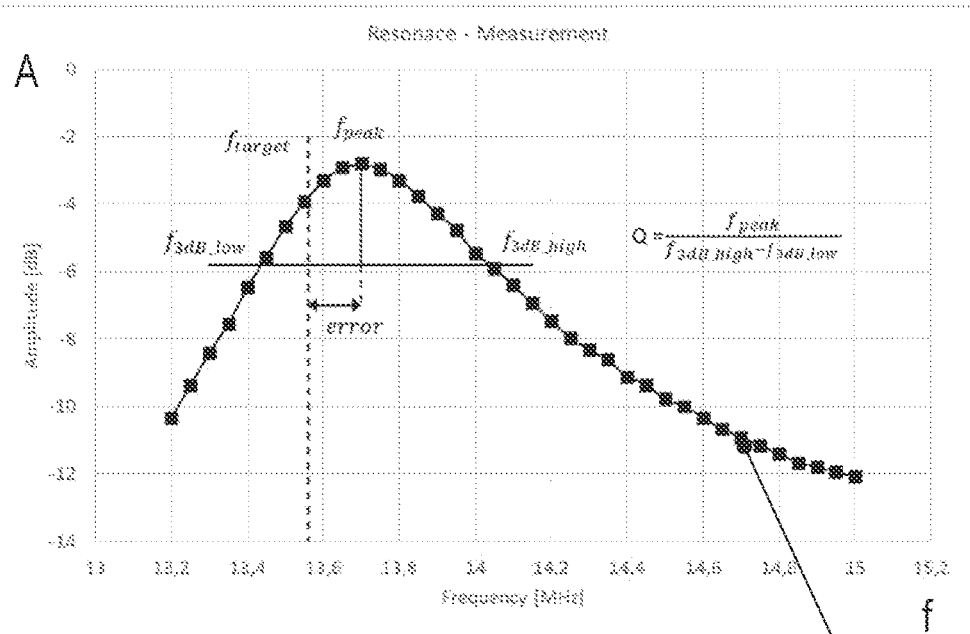
FIG. 2 shows a frequency peak signal with the measured actual resonance frequency of the antenna system of the transmitter and the error to a system defined resonance frequency.

The measurement stage 13 comprises a control logic 14 to activate a measurement mode of the transmitter 1 and to steer the clock generator 10 to sweep the frequency of the clock signal 23. This enables that the wave generator 4 that uses this clock signal 23 with a frequency that is a multiple of the frequency of the carrier signal 5 generates the transmitter data signal 2 with a frequency in a frequency range around the expected or system defined resonance frequency $f_{target}$. In this embodiment of the invention the wave generator 4 is built to generate the transmitter data signal 2 with a frequency of the carrier signal 5 with the system defined NFC resonance frequency $f_{target}$ of 13.56 MHz. The frequency range of the frequency sweep in the measurement mode in this embodiment is fixed for frequencies from 13.2 MHz to 15 MHz as can be seen in FIG. 2. Due to the frequency sweep of the clock signal 23 provided to carrier signal stage 24 in the measurement mode the frequency of the carrier signal 5 provided to the mixer 11 changes from 13.2 to 15 MHz during one frequency sweep. During the measurement mode one or several frequency sweeps may be processed. Above mentioned frequency range is just one example and could cover a much broader or smaller range in this or another frequency area.

Transmitter 1 comprises the mixer 11 that provides an output signal A as shown in a diagram 18 of FIG. 1. This output signal A comprises an amplitude at the frequency of 2×13.56 MHz (=27.12 MHz) and a DC component at 0 Hz frequency that is relevant for further processing, as it comprises the information about the actual amplitude of the receiver data signal 8 for the particular actual frequency during the frequency sweep steered by control logic 14 as can be seen in FIG. 2.

Receiver 9 furthermore comprises a DC compensation stage 15 connected to the mixer 11 to retrieve the DC signal part of the output signal A of the mixer 11 as amplitude of the received modulated receiver data signal 8 for the particular actual frequency steered by the control logic 14. Reference is made to a patent EP 3 267 589 B1 of the same applicant that describes the principal function and use of the DC compensation stage 15 (=DC cancellation stage in EP 3 267 589 B1), which is a feedback-loop to cancel the DC component at 0 Hz frequency for further signal processing of a modulated received data signal 8 from another NFC device in the RF-Field. For this invention disclosed here, the DC component determined by the DC compensation stage 15 is used for the measurement as described. Receiver 9 furthermore comprises an AD converter stage 16 to sample the amplitude of the analogue output signal A of the mixer 11 as digital data to be stored in control logic 14 for the particular actual frequency of the frequency sweep. At the end of the measurement period measurement stage 13 generates a frequency peak signal 17 shown in FIG. 2 based on the digital data stored in control logic 14 during one or more frequency sweeps. The frequency peak signal adds all digital data of the output signal A for the different frequencies during the frequency sweep. FIG. 2 furthermore shows the system defined resonance frequency $f_{target}$ of 13.56 MHz and how the measured actual resonance frequency $f_{peak}$ has to be changed by the frequency difference mentioned as error in FIG. 2.

Transmitter 1 comprises a variable capacity 19 realized within the integrated circuit 6 of the transmitter 1 to adjust the measured actual resonance frequency $f_{peak}$ to the system defined resonance frequency $f_{target}$. Control logic 14 is built to activate an adjustment mode and to steer the variable capacity 19 to adjust the measured actual resonance frequency $f_{peak}$ to the system defined resonance frequency $f_{target}$ that the error becomes zero in the adjustment mode. A person skilled in the art in the design of integrated circuits is well aware of ways to realize a variable capacity 19 within integrated circuit 6 und how to adjust its variable capacity with signals or steering commands from control logic 14. In another embodiment of the invention capacity 19 is realized within integrated circuit 6 could be steered by an external steering signal to adjust the measured actual resonance frequency $f_{peak}$ to the system defined resonance frequency $f_{target}$. In another embodiment of the invention the variable capacity could be realized outside of the integrated circuit 6 as part of matching circuit 12. In this embodiment control logic 14 would adjust the variable capacity with a signal or steering command on a pin of the integrated circuit 6.

In a further preferred embodiment of the invention control logic 14 is built to switch between the measurement mode and the adjustment mode to adjust the measured actual resonance frequency $f_{peak}$ to the system defined resonance frequency $f_{target}$ in an iterative process. This enables to adjust the resonance frequency very accurate.

The inventive transmitter 1 with the measurement stage 13 can be used during tests of a new transmitter set-up (e.g. matching) to optimize the design of the reader with the integrated circuit of the transmitter. For these tests a receiver may be arranged within the RF-Field of the reader or not. But the inventive transmitter 1 with the measurement stage 13 can also be used during normal use of the reader to again tune resonance frequency of the RF-Field of the reader.

In a further embodiment of the invention a variable capacity would be realized within integrated circuit of the transmitter and another variable capacity would be realized outside of integrated circuit of the transmitter in the matching circuit. This enables to tune the resonance frequency in a large range.

In another embodiment of the invention a variable inductivity could be used as well to adjust the measured actual resonance frequency to the system or standard defined resonance frequency.

Figure 3:
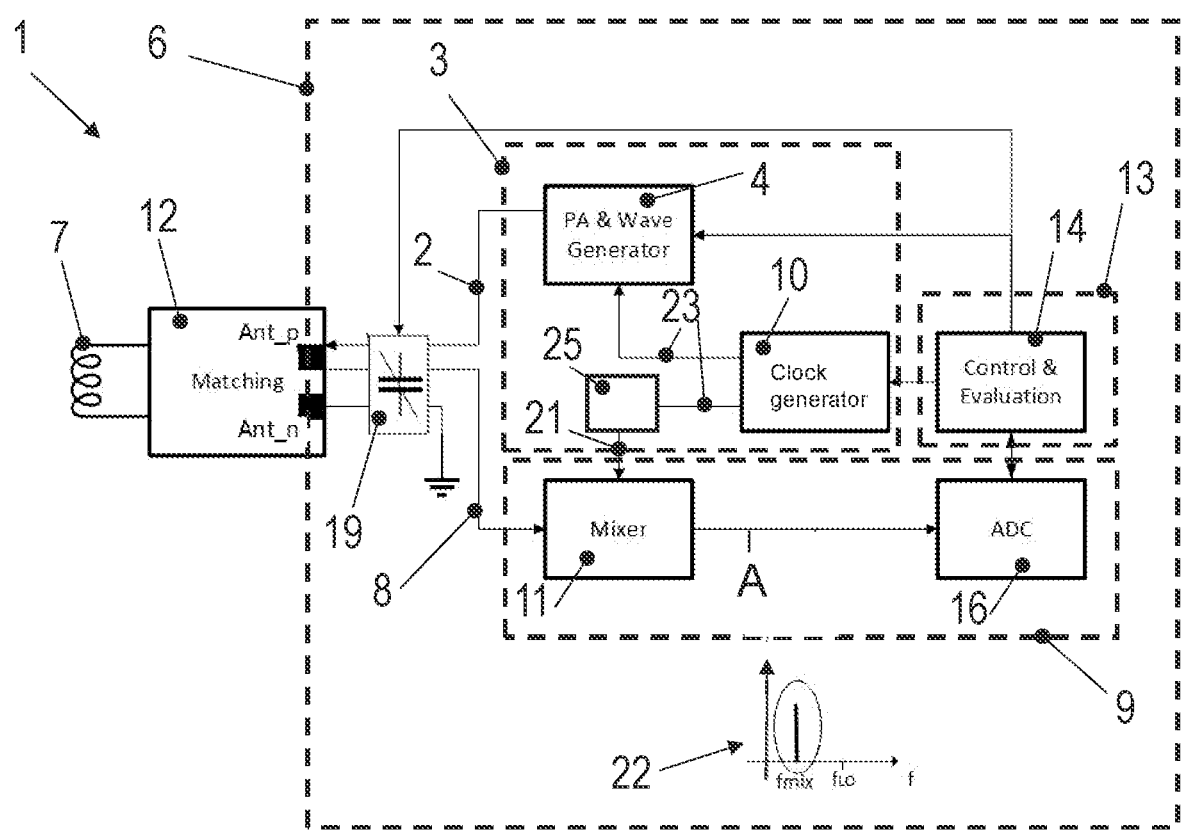
FIG. 3 shows a second embodiment of a transmitter to transmit an amplitude modulated data signal and measure the actual resonance frequency of the antenna system of the transmitter according to the invention.

In a further embodiment shown in FIG. 3 clock generator 10 provides its clock signal 23 to a mixer signal generator 25, which is built to provide a mixer signal 21 with a different frequency than the carrier signal 5 or the multiple of the carrier signal 5 (the clock signal 23) as in the embodiment of FIG. 1 to mixer 11 for the frequency sweep. As one example the mixer signal 21 during the frequency sweep could be 200 Hz higher than the frequency provided by the carrier signal stage 24 in the embodiment of FIG. 1. This means that the wave generator 4 generates the unmodulated transmitter data signal 2 with a sinusoid waveform and an actual frequency that changes from 13.2 to 15 MHz during one frequency sweep while the mixer signal 21 is always e.g. 200 Hz higher than the actual frequency generated. This results in a diagram 22 in FIG. 3 where not the DC component like in FIG. 1, but the frequency component at $f_{mix}$=200 Hz comprises the information about the actual amplitude of the receiver data signal 8 for the particular actual frequency during the frequency sweep steered by control logic 14. To evaluate the amplitude of this frequency component control logic 14 is built to control the AD converter stage 16 to oversample the mixed down signal of mixer 11 and to calculate the amplitude of the output signal A shown in diagram 22. As a result of this calculation again the frequency peak signal 17 is generated at the end of the measurement mode. This embodiment shows that the actual frequency signal used for transmission and the mix signal 21 to mix the received data signal 8 do not have to have the same frequency or a multiple of the frequency. But the embodiment shown in FIG. 1 comprises the advantage that there is no need that the control logic 14 calculates the relevant component as explained above.

Furthermore, in another embodiment the mechanism could be to keep the frequency of the mixer signal 21 constant and only sweep the frequency of the unmodulated transmitter data signal 2 in the measurement mode.

Furthermore, in the embodiment shown in FIG. 3 the antenna pin Ant_n is connected to a defined potential and the antenna pin Ant_p is connected with one line with the transmitter stage 3 and with one line with the receiver stage 9 and the amplitude modulated transmitter data signal 2 and a modulated receiver data signal 8 are signals in relation to the defined potential.

Furthermore in another embodiment of the invention that is based on the embodiment of FIG. 1, carrier signal stage 24 could provide the carrier signal 5 to a modulator that replaces wave generator 4. A data signal to be transmitted could be fed to the modulator that is modulated by the modulator with carrier signal 5. The rest of the functionality would be as explained for the embodiment of FIG. 1.

The invention claimed is:

1. A transmitter configured to transmit a modulated transmitter data signal in an RF-Field over the air and configured to receive a modulated receiver data signal, which transmitter comprises:
    a transmitter stage configured to generate the modulated transmitter data signal with a particular frequency and waveform based on a carrier signal;
    an antenna connected to the transmitter stage via a matching circuit of the transmitter and configured to transmit the modulated transmitter data signal in the RF-Field over the air;
    a receiver stage connected via the matching circuit to the antenna and configured to receive the modulated receiver data signal;
    wherein the transmitter comprises a measurement stage configured to measure an actual resonance frequency (fpeak) of the antenna and its matching circuit connected to the transmitter stage and to the receiver stage,
    wherein the measurement stage comprises a control logic configured to activate a measurement mode and configured to steer a clock generator of the transmitter to sweep the frequency of the carrier signal and/or a mixer signal in a frequency range around an expected or system defined resonance frequency (ftarget) in the measurement mode,
    wherein the transmitter stage comprises a wave generator configured to generate an unmodulated transmitter data signal and wherein the control logic is configured to steer the wave generator to transmit the unmodulated transmitter data signal with the frequency sweep of the carrier signal and the waveform of a sinusoid in the measurement mode, and
    wherein the receiver stage comprises a mixer configured to mix a received unmodulated receiver data signal with the carrier signal of a carrier signal stage of the transmitter and wherein the receiver stage comprises a DC compensation stage connected to the mixer and configured to retrieve a DC signal part of an output signal of the mixer as amplitude of the received unmodulated receiver data signal for the particular frequency (f) of the carrier signal steered by the control logic and configured to generate a frequency peak signal at the end of the measurement mode.

2. The transmitter according to claim 1, wherein the transmitter comprises a variable capacity configured to adjust the measured actual resonance frequency (fpeak) to the system defined resonance frequency (ftarget).

3. The transmitter according to claim 2, wherein the transmitter comprises an integrated circuit with only the antenna and the matching circuit outside of the integrated circuit and with the matching circuit connected to antenna pins (Ant_p; Ant_n) of the integrated circuit and which variable capacity is part of the matching circuit outside of the integrated circuit or which variable capacity is part of the integrated circuit.

4. The transmitter according to claim 3, wherein the control logic is configured to activate an adjustment mode and configured to steer the variable capacity to adjust the measured actual resonance frequency (fpeak) to the system defined resonance frequency (ftarget) in the adjustment mode.

5. The transmitter according to claim 4, wherein the control logic is configured to switch between the measurement mode and the adjustment mode to adjust the measured actual resonance frequency (fpeak) to the system defined resonance frequency (ftarget) in an iterative process.

6. The transmitter according to claim 5, wherein the carrier signal stage is configured to generate the carrier signal with a system defined NFC resonance frequency (ftarget) of 13.56 MHz.

* * * * *